US011164012B2

(12) United States Patent
Boev et al.

(10) Patent No.: US 11,164,012 B2
(45) Date of Patent: Nov. 2, 2021

(54) ADVANCED DRIVER ASSISTANCE SYSTEM AND METHOD

(71) Applicant: Huawei Technologies Co., Ltd., Shenzhen (CN)

(72) Inventors: Atanas Boev, Munich (DE); Onay Urfalioglu, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 16/729,268

(22) Filed: Dec. 27, 2019

(65) Prior Publication Data
US 2020/0134326 A1 Apr. 30, 2020

Related U.S. Application Data (63) Continuation of application No. PCT/EP2017/065986, filed on Jun. 28, 2017.

(51) Int. Cl.
*G06K 9/00* (2006.01)
*B60W 40/072* (2012.01)
(Continued)

(52) U.S. Cl.
CPC ....... *G06K 9/00798* (2013.01); *B60W 40/072* (2013.01); *G06K 9/4638* (2013.01); *G06K 9/6218* (2013.01); *B60W 2552/53* (2020.02)

(58) Field of Classification Search
CPC ............. G06K 9/00798; G06K 9/4638; G06K 9/6218; G06K 9/6211; B60W 40/072; B60W 2552/53
See application file for complete search history.

(56) References Cited

U.S. PATENT DOCUMENTS

| 2008/0137940 A1* | 6/2008 | Kakinami | G06T 7/593 |
| | | | 382/154 |
| 2010/0322476 A1* | 12/2010 | Kanhere | G06T 7/254 |
| | | | 382/103 |

FOREIGN PATENT DOCUMENTS

| CN | 106778593 A | * | 5/2017 | |
| DE | 102009050503 A1 | * | 11/2010 | ............. G08G 1/165 |

(Continued)

OTHER PUBLICATIONS

Fischler et al., "Random Sample Consensus: A Paradigm for Model Fitting with Applications to Image Analysis and Automated Cartography," Communications of the ACM, vol. 24, No. 6, pp. 381-395, Association for Computing Machinery, New York, New York (Jun. 1981).

Meler et al., "BetaSAC: A New Conditional Sampling for RANSAC," British Machine Vision Conference, BMVC 2010, pp. 1-11, Aberystwyth, UK (Aug. 31-Sep. 3, 2010).

(Continued)

*Primary Examiner* — Matthew C Bella
*Assistant Examiner* — Kathleen M Broughton
(74) *Attorney, Agent, or Firm* — Leydig, Voit & Mayer, Ltd.

(57) ABSTRACT

A driver assistance system detects lane markings in a perspective image of a road in front of a vehicle. The driver assistance system extracts a plurality of features, in particular lane markings, from the perspective image for generating a set of feature coordinates, in particular lane marking coordinates. The system generates a plurality of pairs of feature coordinates, each pair defining a straight line, and estimates a lane curvature on the basis of a subset of the pairs of feature coordinates. For each pair a straight line defined (Continued)

by the pair intersects a predefined target portion of the perspective image, the predefined target portion including a plurality of possible positions of a vanishing point.

15 Claims, 7 Drawing Sheets

(51) Int. Cl.
  *G06K 9/46* (2006.01)
  *G06K 9/62* (2006.01)

(56) References Cited

FOREIGN PATENT DOCUMENTS

| | | | | |
|---|---|---|---|---|
| EP | 1221642 | A2 | 7/2002 | |
| EP | 2168079 | B1 * | 1/2015 | ............. G06T 7/246 |
| EP | 2960829 | A2 | 12/2015 | |
| JP | 2003256854 | A | 9/2003 | |
| JP | 2004199341 | A | 7/2004 | |
| JP | 2015149028 | A * | 8/2015 | ............... B60R 1/00 |
| KR | 20160083410 | A * | 7/2016 | |

OTHER PUBLICATIONS

Botterill et al., "New Conditional Sampling Strategies for Speeded-Up RANSAC," British Machine Vision Conference, BMVC 2009, pp. 1-11, London, UK (Sep. 7-10, 2009).

Bar Hillel et al., "Recent progress in road and lane detection: a survey," Machine Vision and Applications pp. 727-745, Springer Verlag, New York, New York (2014).

"Know you can. The BMW X5", http://www.bmw.com/com/en/newvehicles/x/x5/2013/showroom/driver_assistance/camera_systems.html, pp. 1-6, retrieved from the internet Mar. 2, 2020.

Geiger et al. "Are we ready for Autonomous Driving? The KITTI Vision Benchmark Suite," 2012 IEEE Conference on Computer Vision and Pattern Recognition, pp. 3354-3361, Institute of Electrical and Electronics Engineers, New York, New York (2012).

Geiger, A.,et al., "Vision meets Robotics: The KITTI Dataset," The International Journal of Robotics Research, vol. 32, No. 11, pp. 1231-1237, SAGE Publications, Thousand Oaks, California (2013).

* cited by examiner

ADVANCED DRIVER ASSISTANCE SYSTEM AND METHOD

CROSS-REFERENCE TO RELATED APPLICATIONS

This application is a continuation of International Application No. PCT/EP2017/065986, filed on Jun. 28, 2017, the disclosure of which is hereby incorporated by reference in its entirety.

TECHNICAL FIELD

The present disclosure relates to the field of image processing and analysis. More specifically, the present disclosure relates to a driver assistance system for estimating lane curvature on the basis of images of lane markings of a road.

BACKGROUND

Advanced driver assistance systems (ADASs), which either alert the driver in dangerous situations or take an active part in the driving, are gradually being inserted into vehicles. Such systems are expected to grow more and more complex towards full autonomy during the near future. One of the main challenges in the development of such systems is to provide an ADAS with road and lane perception capabilities.

Road color and texture, road boundaries and lane markings are the main perceptual cues for human driving. Semi and fully autonomous vehicles are expected to share the road with human drivers, and would therefore most likely continue to rely on the same perceptual cues humans do. While there could be, in principle, different infrastructure cuing for human drivers and vehicles (e.g. lane markings for humans and some form of vehicle-to-infrastructure communication for vehicles) it is unrealistic to expect the huge investments required to construct and maintain such double infrastructure, with the associated risk in mismatched marking. Road and lane perception via the traditional cues remains therefore the most likely path for autonomous driving.

Road and lane understanding includes detecting the extent of the road, the number and position of lanes, merging, splitting and ending lanes and roads, in urban, rural and highway scenarios. Although much progress has been made in recent years, this type of understanding is beyond the reach of current perceptual systems.

There are several sensing modalities used for road and lane understanding, including vision (i.e. one video camera), stereo, LIDAR, vehicle dynamics information obtained from car odometry or an Inertial Measurement Unit (IMU) with global positioning information obtained using the Global Positioning System (GPS) and digital maps. Vision is the most prominent research area in lane and road detection due to the fact that lane markings are made for human vision, while LIDAR and global positioning are important complements. Generally, lane and road detection in an ADAS includes the extraction of low-level features from an image (also referred to as "feature extraction"). For road detection, these typically include color and texture statistics allowing road segmentation, road patch classification or curb detection. For lane detection, evidence for lane markings is collected, for instance, in the form of feature coordinates, i.e. coordinates of potential lane markings. Very often the set of feature coordinates, i.e. lane coordinate candidates provided by a feature extraction stage includes some outliers, i.e. lane coordinate candidates. For the final purpose of estimating a lane curvature, generally a line is fitted to the set of feature coordinates and the task is to find a set of feature coordinates, which are highly probable to support a line model corresponding to the lane markings on the image.

For line fitting, it is common to apply a popular method called RANSAC (random sample consensus) originally described in Martin A. Fischler and Robert C. Bolles, "Random sample consensus: A paradigm for model fitting with applications to image analysis and automated cartography", Communications of the ACM, 24(6):381-395, 1981. The computational cost of RANSAC is proportional to the number of iterations, which is the number of hypothesis sets that are chosen before a good enough model is found. Often this is not sufficient to be applied for real-time applications, such as an ADAS.

Some recent improvements to the RANSAC approach fall in the category of conditional sampling, such as BetaSAC disclosed in Antoine Méler, Marion Decrouez, and James Crowley, "BetaSAC: A New Conditional Sampling For RANSAC", in Frĕdĕric Labrosse, Reyer Zwiggelaar, Yonghuai Liu, and Bernie Tiddeman, editors, Proceedings of the British Machine Vision Conference, pages 42.1-42.11. BMVA Press, September 2010. doi:10.5244/C.24.42, BaySAC and SimSAC disclosed in Boterill, T., Mills, S., and Green, R., "New conditional sampling strategies for speeded-up ransac", in Proceedings of the British Machine Vision Conference (2009). BetaSAC, for instance, builds a hypothesis set incrementally, selecting data points conditional on the previous data selected for the set. Such sampling is shown to provide more suitable samples in terms of inlier-ratio and has the potential to lead to a more accurate parameter estimation. These improvements, however, cannot be applied to the specific problem of lane marking detection.

Thus, there is a need for an improved driver assistance system as well as a corresponding method.

SUMMARY

Embodiments of the present invention provide an improved driver assistance system as well as a corresponding method.

According to a first aspect, the disclosure relates to a driver assistance system for a vehicle. The driver assistance system is configured to detect lane markings in a perspective image of a road in front of the vehicle, where the perspective image defines a vanishing point of the road. As will be appreciated, the position of the vanishing point in the perspective image can depend, for instance, on the position and/or orientation of a camera used for capturing the perspective image relative to the road as well as properties of the road, such as the road curvature, road inclination, and the like.

The driver assistance system according to the first aspect includes: a feature extraction unit configured to extract a plurality of features, in particular lane markings, from the perspective image for generating a set of feature coordinates, in particular lane marking coordinates, where the set of feature coordinates defines respective positions of the plurality of features in the perspective image; and a processing unit configured to generate a plurality of pairs of feature coordinates, where each pair of feature coordinates defines a straight line, and to estimate a lane curvature on the basis of a subset of the plurality of pairs of feature coordinates. For each pair of feature coordinates of the subset of the plurality of pairs of feature coordinates, a respective straight line defined by, i.e. running through the pair of feature coordinates, intersects a predefined target portion of the perspective image The predefined target portion includes a plurality of possible positions of the vanishing point.

Thus, an improved ADAS is provided. The improved ADAS is based on the general idea of refining a sampling scheme, such as the RANSAC algorithm, by applying a specific constraint, which has to be met by the feature coordinates to be used for the model fitting. The constraint is chosen to be the one suitable to the specific problem of lane marking detection. Briefly, the a-priori definition of the target portion, i.e. the area where the vanishing point might appear in the image, has been chosen as a constraint to "guide" or "direct" the sampling scheme, in particular the RANSAC algorithm. As a result, the improved ADAS provides a significant increase in robustness and speed, and a significant decrease in computational complexity.

In a further implementation form of the first aspect, the predefined target portion has a quadrilateral shape in the perspective image, defined, for instance, by a width, a height, and the coordinates of a central point or a corner of the quadrilateral target portion. This allows for a computationally efficient definition of the predefined target portion.

In a further implementation form of the first aspect, the processing unit is configured to estimate the lane curvature on the basis of the subset of the plurality of pairs of feature coordinates using a RANSAC algorithm.

In a further implementation form of the first aspect, the processing unit is configured to estimate the lane curvature on the basis of the subset of the plurality of pairs of feature coordinates using a RANSAC algorithm by performing the following steps: randomly selecting n pairs of feature coordinates, where n is the minimum number needed to generate a fitting model; generate the fitting model on the basis of the n pairs of feature coordinates; counting the number of pairs of feature coordinates consistent with this fitting model; and repeating the previous steps until a fitting model consistent with a large number of pairs of feature coordinates is found.

In a further implementation form of the first aspect, the processing unit is configured to generate the plurality of pairs of feature coordinates by dividing the perspective image into a plurality of horizontally extending stripes and by processing the plurality of horizontally extending stripes from bottom to top of the perspective image.

In a further implementation form of the first aspect, for a currently processed horizontally extending stripe the processing unit is configured to divide the currently processed horizontally extending stripe into a plurality of source windows and to generate first feature coordinates of a pair of feature coordinates by selecting feature coordinates from at least one feature located in at least one of the plurality of source windows.

In a further implementation form of the first aspect, for the currently processed horizontally extending stripe the processing unit is configured to divide the neighbouring horizontally extending stripe above the currently processed horizontally stripe into a plurality of destination windows and to generate second feature coordinates of a pair of feature coordinates by selecting feature coordinates from at least one feature located in at least one of the plurality of destination windows.

In a further implementation form of the first aspect, the plurality of destination windows of the neighbouring horizontally extending stripe above the currently processed horizontally stripe are at least partially overlapping.

In a further implementation form of the first aspect, the processing unit is configured to cluster the plurality of straight lines defined by the plurality of pairs of feature coordinates of the subset of the plurality of pairs of feature coordinates into a set of straight line clusters consisting of one or more of the plurality of straight lines and to determine for each straight line cluster a representative cluster line.

In a further implementation form of the first aspect, the processing unit is configured to estimate the lane curvature on the basis of the set of representative cluster lines.

In a further implementation form of the first aspect, the system further includes a stereo camera configured to provide the perspective image of the road in front of the vehicle as a stereo image having a first channel and a second channel.

In a further implementation form of the first aspect, the feature extractor is configured to extract features independently from the first channel of the stereo image and the second channel of the stereo image. The system further includes a filter unit configured to determine those features, which have been extracted from both the first channel and the second channel of the stereo image.

According to a second aspect, the disclosure relates to a corresponding method of detecting lane markings in a perspective image of a road in front of a vehicle, where the perspective image defines a vanishing point of the road. The method includes the steps of: extracting a plurality of features, in particular lane markings, from the perspective image for generating a set of feature coordinates, in particular lane marking coordinates, where the set of feature coordinates defines respective positions of the plurality of features in the perspective image; generating a plurality of pairs of feature coordinates, where each pair of feature coordinates defines a straight line; and estimating a lane curvature on the basis of a subset of the plurality of pairs of feature coordinates, where for each pair of feature coordinates of the subset of the plurality of pairs of feature coordinates a respective straight line defined by, i.e. running through the pair of feature coordinates, intersects a predefined target portion of the perspective image, where the predefined target portion includes a plurality of possible positions of the vanishing point.

The method according to the second aspect of the disclosure can be performed by the ADAS according to the first aspect of the disclosure. Further features of the method according to the second aspect of the disclosure result directly from the functionality of the ADAS according to the first aspect of the disclosure and its different implementation forms.

According to a third aspect the disclosure relates to a computer program including program code for performing the method according to the second aspect when executed on a computer or a processor.

Embodiments of the present invention can be implemented in hardware and/or software.

BRIEF DESCRIPTION OF THE DRAWINGS

Exemplary embodiments of the present invention will be described with respect to the following figures, wherein.

In the various figures, identical reference signs will be used for identical or at least functionally equivalent features.

DETAILED DESCRIPTION

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
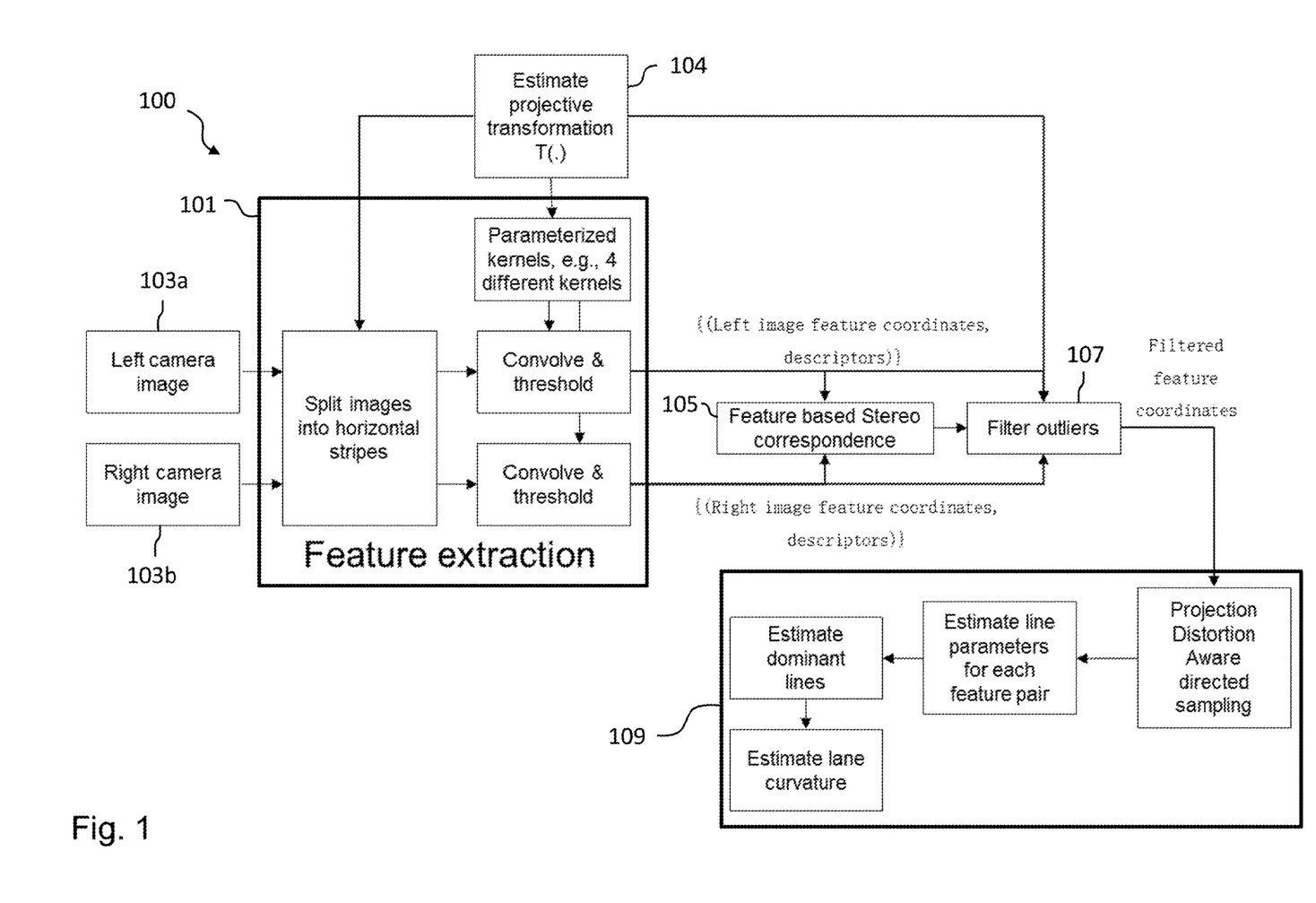
FIG. 1 shows a schematic diagram illustrating a driver assistance system according to an embodiment.

FIG. 1 shows a schematic diagram of an advanced driver assistance system (ADAS) 100 according to an embodiment for a vehicle. The ADAS 100 is configured to detect lane markings in a perspective image of a road in front of the vehicle, where the perspective image defines a vanishing point of the road. As will be appreciated, the position of the vanishing point in the perspective image can depend, for instance, on the position and/or orientation of the camera of the vehicle used for capturing the perspective image relative to the road as well as properties of the road, such as the road curvature, road inclination and the like.

In the embodiment shown in FIG. 1, the ADAS 100 includes a stereo camera configured to provide a stereo image having a first channel or left camera image 103a and a second channel or right camera image 103b. The stereo camera can be installed on a suitable position of the vehicle such that the left camera image 103a and the right camera image 103b provide at least partial views of the environment in front of the vehicle, e.g. a portion of a road. The exact position and/or orientation of the stereo camera of the ADAS 100 defines a camera projection parameter $\Theta$.

As illustrated in FIG. 1, the ADAS 100 further includes a feature extractor 101, which is configured to extract features from the perspective image(s), such as the left camera image 103a and the right camera image 103b provided by the stereo camera. The features extracted by the feature extractor 101 can include coordinates of lane markings, such as x- and y-coordinates, on the road shown in the perspective image(s).

Figure 3:
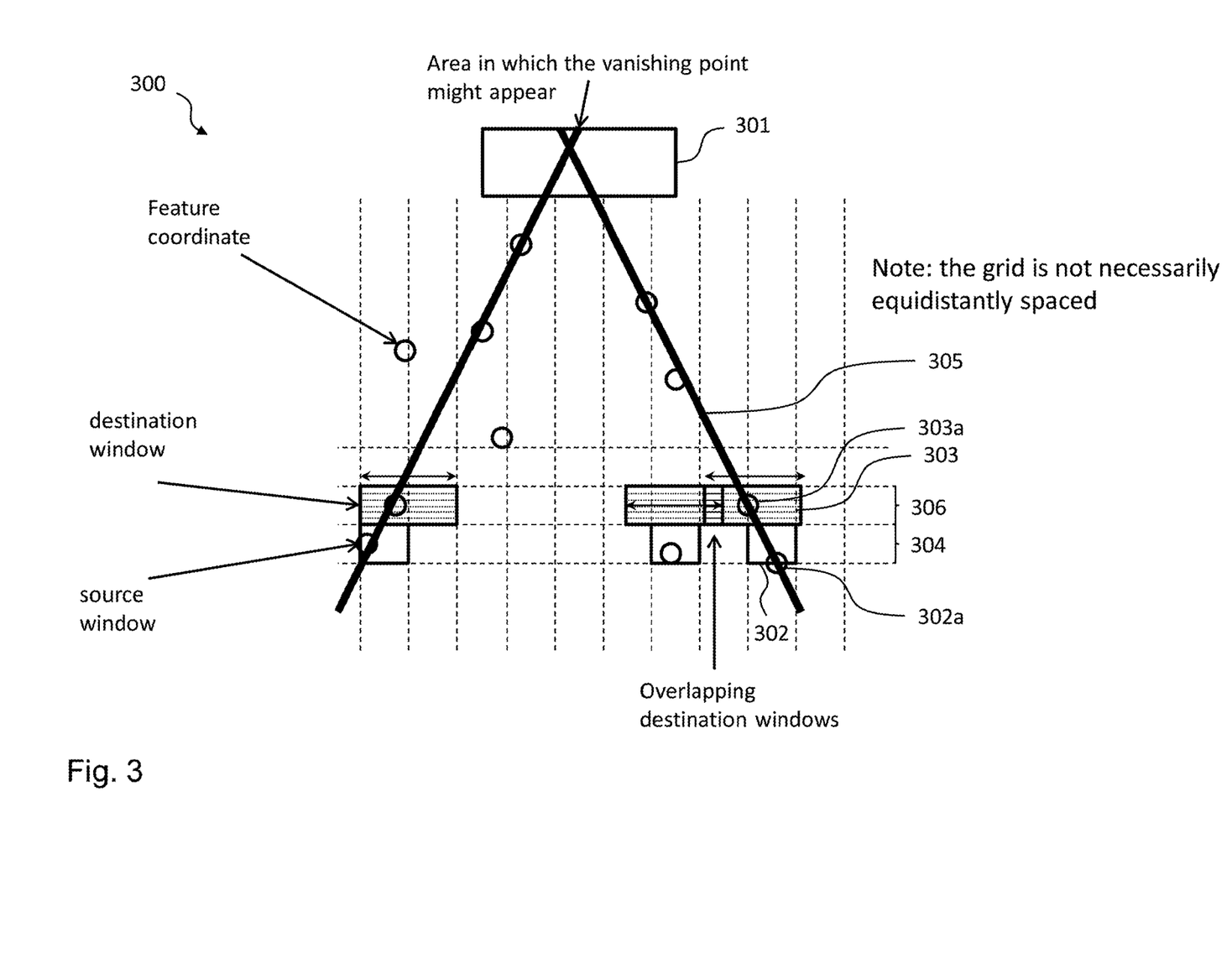
FIG. 3 shows a schematic diagram illustrating an exemplary perspective image of a road processed and analyzed by a driver assistance system according to an embodiment.

Moreover, the ADAS 100 includes a processing unit 109 configured to generate a plurality of pairs of feature coordinates, where each pair of feature coordinates defines a straight line, and to estimate a lane curvature on the basis of a subset of the plurality of pairs of feature coordinates, where for each pair of feature coordinates of the subset of the plurality of pairs of feature coordinates a respective straight line defined by, i.e. running through the pair of feature coordinates intersects a predefined target portion of the perspective image, where the predefined target portion includes a plurality of possible positions of the vanishing point, as will be described in more detail further below in particular in the context of FIG. 3.

As illustrated in FIG. 1, the feature extractor 101 of the ADAS 100 can be configured to separate the perspective image of the road into a plurality of horizontal stripes, where each horizontal stripe of the perspective image corresponds to a different road portion at a different average distance from the vehicle. The feature extractor 101 can be further configured to extract features from the plurality of horizontal stripes on the basis of a plurality of kernels, where each kernel is associated with a kernel width.

In an embodiment, the feature extractor 101 can be further configured to perform convolution operations and compare the respective result of a respective convolution operation with a respective threshold value for extracting the features, in particular coordinates of the lane markings. Mathematically, such a convolution operation can be described by the following equation for a 2-D discrete convolution:

$$O(i, j) = \sum_{m=0}^{Kr-1} \sum_{n=0}^{Kc-1} K(m, n) \times I(i-m, j-n)$$

where the kernel K is a matrix of the size (Kr×Kc) or (Kernel row or height×Kernel column or width) and I(i, j) and O (i, j) denote the respective arrays of input and output image intensity values. The feature extractor 101 of the ADAS 100 can be configured to perform feature extraction on the basis of a horizontal 1-D kernel K, i.e. a kernel with a kernel matrix only depending on m (i.e. the horizontal direction) but not on n (i.e. the vertical direction).

In the exemplary embodiment shown in FIG. 1, the features extracted by the feature extractor 101 are provided to a unit 105 configured to determine those features, which have been extracted from both the left camera image 103a and the right camera image 103b of the stereo image. Only these matching features determined by the unit 105 are passed on to a filter unit 107 configured to filter outliers. The filtered feature coordinates are provided to the processing unit 109.

Figure 2:
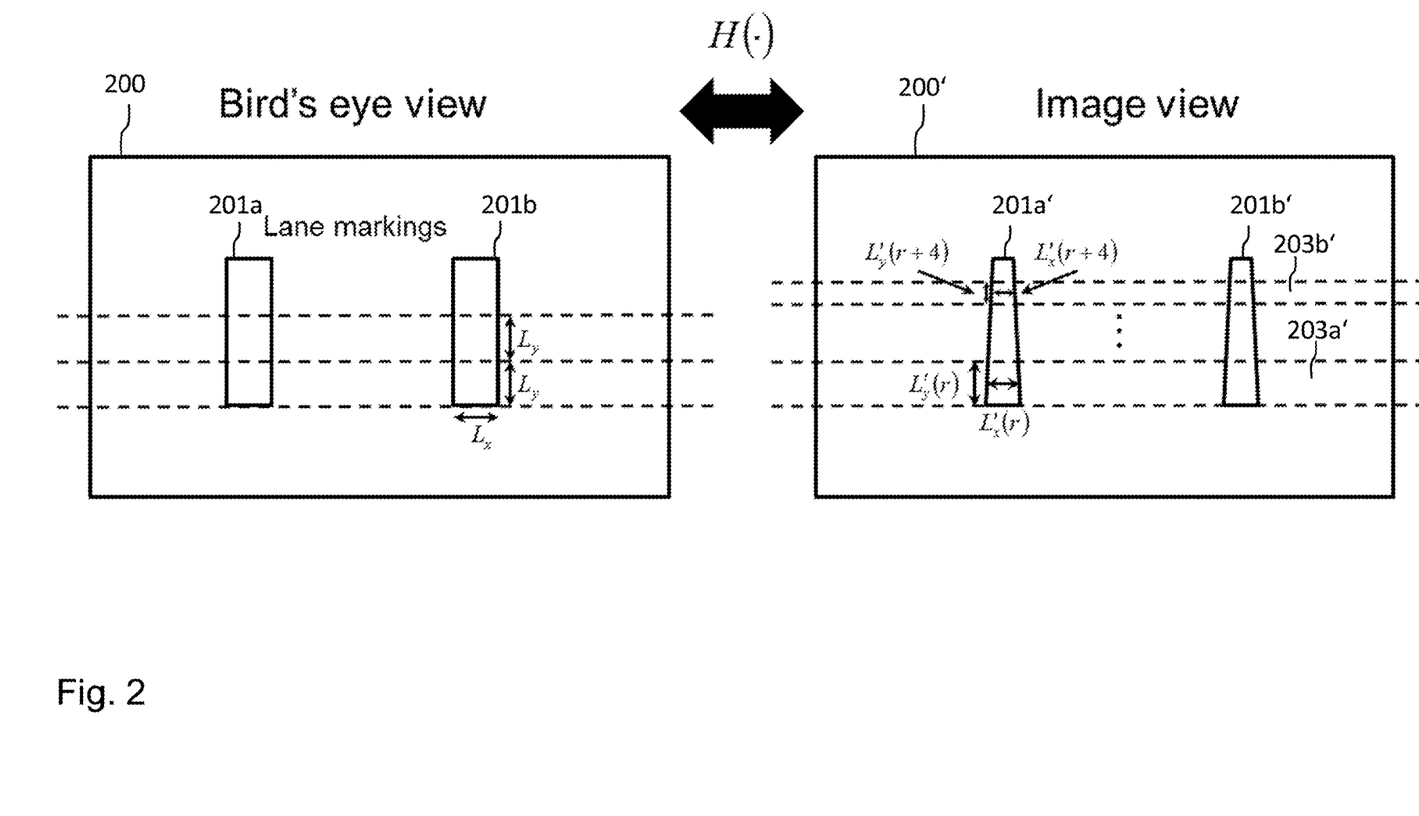
FIG. 2 shows a schematic diagram illustrating different aspects of a driver assistance system according to an embodiment.

As illustrated in FIG. 1, the ADAS 100 can further include a unit 104 for performing a transformation between the bird's eye view and a perspective view and vice versa. FIG. 2 illustrates the relation between a bird's eye view 200 and a corresponding perspective image view 200' of an exemplary environment in front of a vehicle, namely a road including two exemplary lane markings 201a, b and 201a', b', respectively.

The geometrical transformation from the bird's eye view, i.e. the non-distorted view 200 to the perspective image view, i.e. the distorted view 200' is feasible through a transformation matrix H which maps each point of the distorted domain into a corresponding point of the non-distorted domain and vice versa, as the transformation operation is invertible.

$L_x$ and $L_y$ are the non-distorted expected width of lane marking and sampling step, respectively. They may be obtained from the camera projection parameter $\Theta$, the expected physical width $\Omega$ of the lane marking, and the expected physical gap $\Psi$ between the markings of a dashed line.

$$L_y = f(\Theta, \Omega, \Psi)$$

$$L_x = f(\Theta, \Omega, \Psi)$$

Each horizontal stripe of index r in the image view has the height of a distorted sampling step $L'_y(r)$, which corresponds to the non-distorted sampling step, i.e. $L_y$.

The expected width of lane marking at stripe r is denoted by a distorted expected width $L'_x(r)$, which corresponds to the non-distorted expected width of lane marking $L_x$. The geometrical transformation from the distorted domain (original image) to the non-distorted domain (bird's eye view) is feasible through a transformation matrix H which maps each point of the distorted domain into a corresponding point of the non-distorted domain. The operation is invertible.

As illustrated in the perspective image view 200' of FIG. 2 and as already mentioned in the context of FIG. 1, the feature extractor 101 of the ADAS 100 can be configured to separate the exemplary perspective input image 200' into a plurality of horizontal stripes, i.e. horizontally extending stripes. In FIG. 2, two exemplary horizontal stripes are illustrated, namely a first exemplary horizontal stripe 203a' identified by first stripe identifier r as well as a second exemplary horizontal stripe 203b' identified by a second stripe identifier r+4. In the exemplary embodiment shown in FIG. 2, the second exemplary horizontal stripe 203b' is above the first exemplary horizontal stripe 203a' and, thus, provides an image of a road portion, which has a larger average distance from the camera of the ADAS 100 than a road portion covered by the first exemplary horizontal stripe 203a'.

As will be appreciated and as illustrated in FIG. 2, due to distortion effects the horizontal width $L'_x(r)$ of the lane marking 201a' within the horizontal stripe 203a' is larger than the horizontal width $L'_x(r+4)$ of the lane marking 201a' within the horizontal stripe 203b'. Likewise, the vertical height $L'_y(r)$ of the horizontal stripe 203a' is larger than the vertical height $L'_y(r+4)$ of the horizontal stripe 203b'.

As already mentioned above, the processing unit 109 of the ADAS shown in FIG. 1 is configured to generate a plurality of pairs of feature coordinates, where each pair of feature coordinates defines a straight line, and to estimate a lane curvature on the basis of a subset of the plurality of pairs of feature coordinates, where for each pair of feature coordinates of the subset of the plurality of pairs of feature coordinates a respective straight line defined by, i.e. running through the pair of feature coordinates intersects a predefined target portion of the perspective image, where the predefined target portion includes a plurality of possible positions of the vanishing point.

FIG. 3 shows an exemplary perspective image 300 of a road with an exemplary predefined target portion 301, i.e. area in which the vanishing point might appear. As will be appreciated, the position of the vanishing point in the perspective image 300 can depend on such parameters as the position and/or orientation of the camera used for capturing the perspective image 300 relative to the road as well as properties of the road, such as the road curvature, road inclination and the like. The exemplary predefined target portion 301 shown in FIG. 3 has a quadrilateral shape defined, for instance, by a width, a height and the coordinates of a central point or a corner of the quadrilateral target portion 301. Other shapes of the predefined target portion 301 are possible as well.

In addition to the predefined target portion 301, FIG. 3 shows a plurality of feature coordinates provided by the feature extractor 101 of the ADAS 100, for instance, the feature coordinates 302a and 303a. These feature coordinates can be consistent with ("inliers") or not consistent with ("outliers") a respective fitting model used by the processing unit 109 for estimating a lane curvature.

In an embodiment, the processing unit 109 of the ADAS 100 is configured to estimate the lane curvature on the basis of the subset of the plurality of pairs of feature coordinates using a RANSAC (random sample consensus) algorithm. Thus, in an embodiment, the processing unit 109 of the ADAS 100 is configured to estimate the lane curvature on the basis of the subset of the plurality of pairs of feature coordinates by performing the following steps: randomly selecting n pairs of feature coordinates, where n is the minimum number needed to generate a fitting model; generate the fitting model on the basis of the n pairs of feature coordinates; counting the number of pairs of feature coordinates consistent with this fitting model; and repeating the previous steps until a fitting model consistent with a large number of pairs of feature coordinates is found.

As can be taken from FIG. 3, the processing unit 109 of the ADAS 100 is configured to generate the plurality of pairs of feature coordinates by dividing the perspective image 300 into a plurality of horizontally extending stripes, such as a currently processed horizontal stripe 304 and a neighbouring horizontal stripe 306, and by processing the plurality of horizontally extending stripes from bottom to top of the perspective image 300. The processing unit 109 can be configured to divide the currently processed horizontally extending stripe 304 into a plurality of source windows, such as the exemplary source window 302, and to generate first feature coordinates of a pair of feature coordinates by selecting feature coordinates from a feature 302a located in the source window 302. The processing unit 109 can be further configured to divide the neighbouring horizontally extending stripe 306 directly above the stripe 304 into a plurality of destination windows, such as the exemplary destination window 303, and to generate second feature coordinates of a pair of feature coordinates by selecting feature coordinates a feature 303a located in the destination window 303. However, the processing unit 109 will select the corresponding pair of feature coordinates associated with the features 302a and 303a and use the same for estimating the lane curvature, if the straight line defined by these feature coordinates, namely the straight line 305 shown in FIG. 3, intersects the predefined target portion 301 of the perspective image 301. If this not the case, the corresponding pair of feature coordinates is considered to be an outlier and will not be used by the RANSAC algorithm for estimating the lane curvature. As illustrated in FIG. 3, the plurality of destination windows can be at least partially overlapping.

As will be appreciated, a source/destination window can contain zero or more feature coordinates and may have an arbitrarily defined size. In an embodiment, the destination windows can be wider than the source windows. A source window can be considered as a grid located within the perspective image 300. The grid is not necessarily equidistantly spaced. For example, an equidistantly spaced grid is obtained by dividing the image width by a constant cw and the image height by a constant ch. In an embodiment, the scanning operation places a source window on possible lane marking appearances in the perspective image 300, e.g., only the lower half part of the perspective image 300 is scanned.

As already described above, a destination window (which can be considered to define a guided search area) is located in the horizontal stripe "above" the source window stripe. There is no overlap between source and destination windows. The destination windows may overlap between them. In an embodiment, the construction of a destination window is taking into account the a-priori definition of the target portion, i.e. the area where the vanishing point might appear (e.g., given a stereo camera, the vanishing point might appear in the middle of the camera at a certain distance). Therefore, the destination window for a source window located on the left side tends to occupy more space to the right of the source window). The windows scan the image horizontally and vertically.

Figure 4:
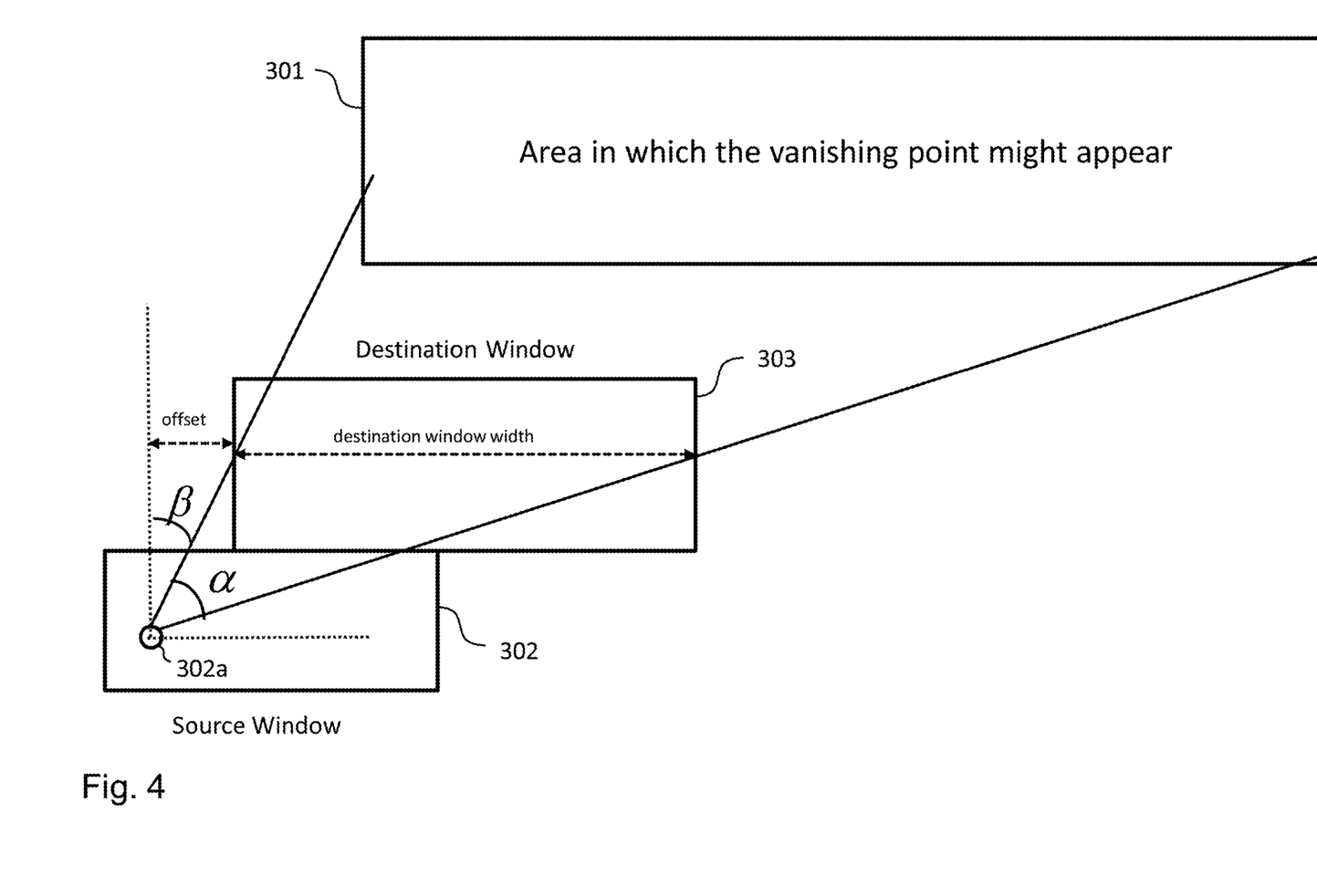
FIG. 4 shows a schematic diagram illustrating different aspects of a driver assistance system according to an embodiment.

As can be taken from FIG. 4, the relative sizes of a destination window, such as the destination window 303, and the predefined target portion 301 and the orientations of the same relative to a feature 302a located in the source window 302 can be expressed by two angles $\alpha$, $\beta$. In an embodiment, those angles will determine the offset and width of the destination window 303. The angles are derived by taking into account the target portion 301, i.e. the area in which the vanishing point might appear.

Figure 5:
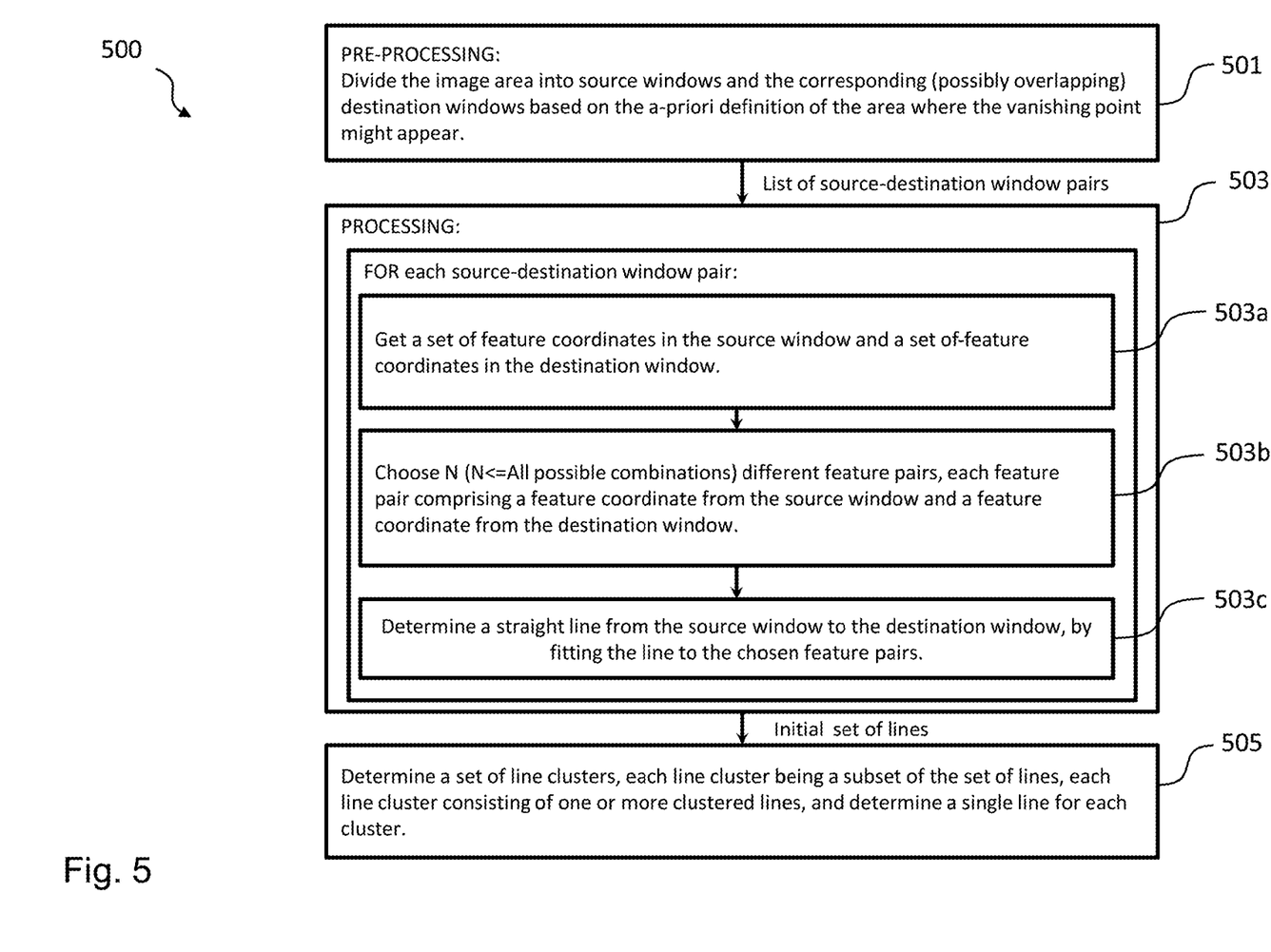
FIG. 5 shows a schematic diagram illustrating several processing steps implemented in a driver assistance system according to an embodiment.

FIG. 5 shows a schematic diagram summarizing the processing steps implemented in the processing unit 109 of the ADAS 100 according to an embodiment.

In a pre-processing stage 501 the perspective image 300 (or at least a part thereof) is divided into source windows, such as the source window 302, and the corresponding (possibly overlapping) destination windows, such as the destination window 302, based on the a-priori definition of the target portion 301, i.e. the area where the vanishing point might appear.

In a processing stage 503 the following steps are performed for every source-destination window pair:

In a step 503a obtaining a set of feature coordinates in the source window, for instance in the source window 302, and a set of feature coordinates in the destination window, for instance in the destination window 303.

In a step 503b choosing N (N<=All possible combinations) different feature pairs, where each feature pair includes a feature coordinate from the source window 302 and a feature coordinate from the destination window 303.

In a step 503c determining a straight line, such as the straight line 305, from the source window 302 to the destination window 303, by fitting the line to the chosen feature pairs.

The above steps 503a-c provide an initial set of lines for each source-destination window pair. In a final stage 505 this initial set of lines can be further processed by clustering these lines into a set of straight line clusters consisting of one or more of the plurality of straight lines and to determine for each straight line cluster a representative cluster line. In such an embodiment, the processing unit 109 of the ADAS can estimate the lane curvature on the basis of the set of representative cluster lines.

Figure 6:
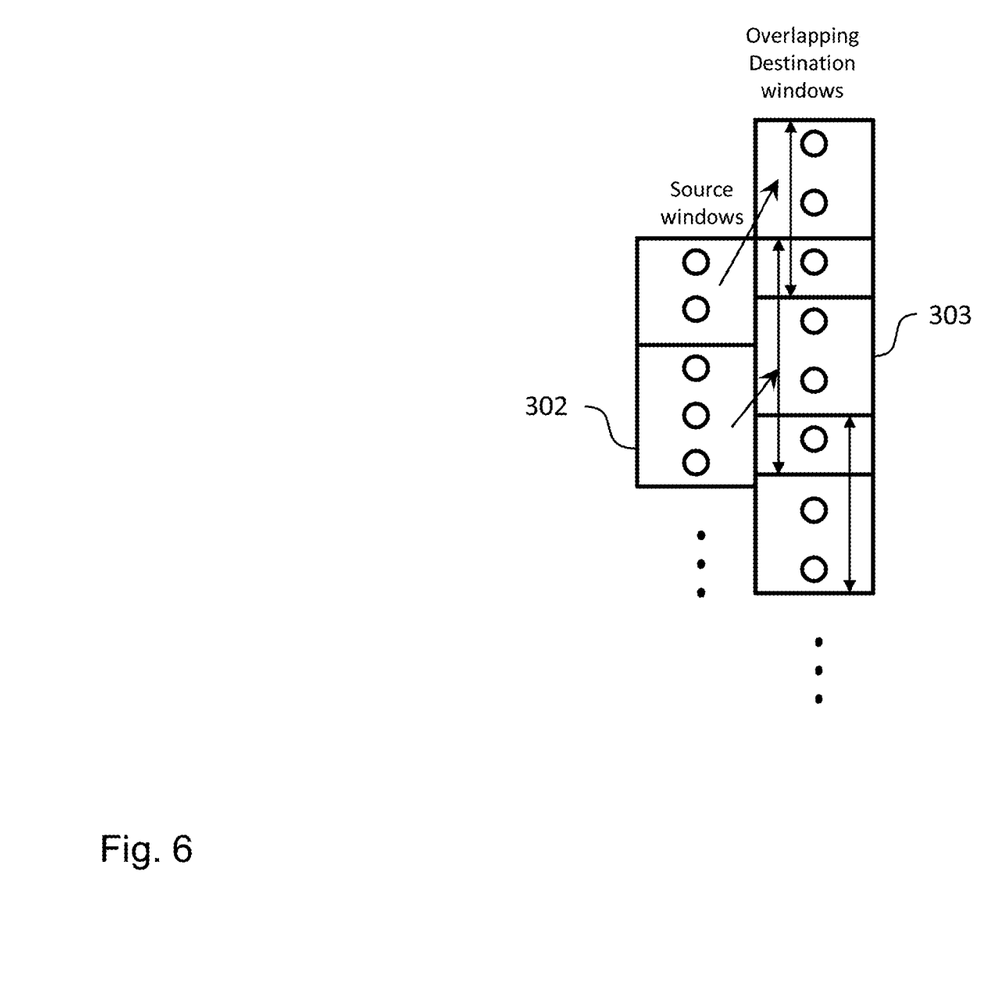
FIG. 6 shows a schematic diagram illustrating different aspects of a driver assistance system according to an embodiment.

FIG. 6 further illustrates the relation between the source windows, such as the source window 302, and the destination windows, such as the destination window 303, used for determining the lane curvature.

Figure 7:
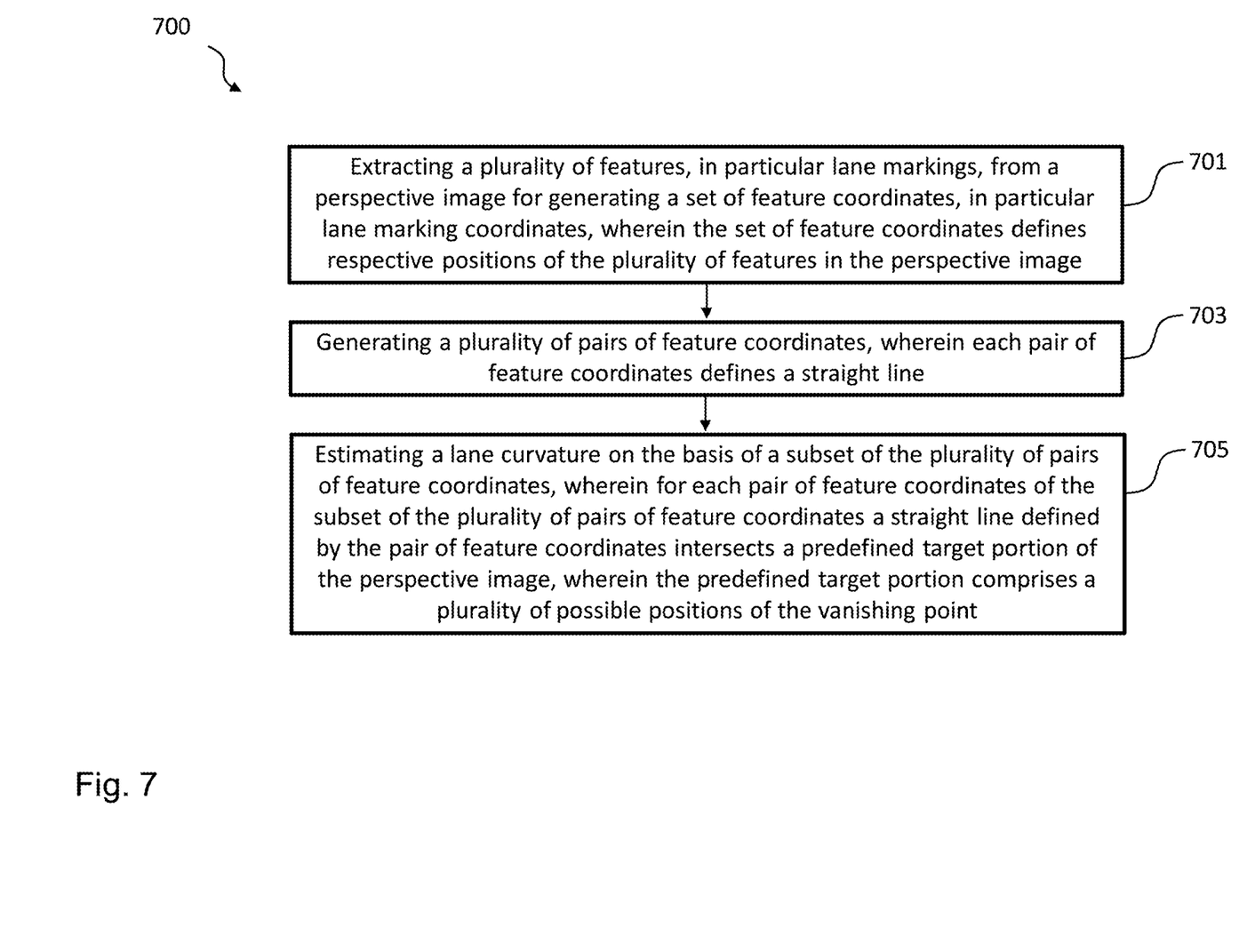
FIG. 7 shows a schematic diagram illustrating a method of operating a driver assistance system according to an embodiment.

FIG. 7 shows a schematic diagram illustrating a corresponding method 700 of detecting lane markings in a perspective image of a road in front of a vehicle, where the perspective image defines a vanishing point of the road. The method 700 includes the steps of: extracting 701 a plurality of features, in particular lane markings, from the perspective image for generating a set of feature coordinates, in particular lane marking coordinates, where the set of feature coordinates defines respective positions of the plurality of features in the perspective image; generating 703 a plurality of pairs of feature coordinates, where each pair of feature coordinates defines a straight line; and estimating 705 a lane curvature on the basis of a subset of the plurality of pairs of feature coordinates, where for each pair of feature coordinates of the subset of the plurality of pairs of feature coordinates a respective straight line defined by, i.e. running through the pair of feature coordinates intersects a predefined target portion of the perspective image, where the predefined target portion includes a plurality of possible positions of the vanishing point.

While a particular feature or aspect of the disclosure may have been disclosed with respect to only one of several implementations or exemplary embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although exemplary aspects have been illustrated and described herein, it will be appreciated that a variety of alternate and/or equivalent implementations may be substituted for the exemplary aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present invention beyond those described herein. While the invention has been described with reference to one or more particular embodiments, those skilled in the art recognize that many changes may be made thereto without departing from the scope of the present invention. It is therefore to be understood that within the scope of the appended claims and their equivalents, the present invention may be practiced otherwise than as specifically described herein.

What is claimed is:

1. A driver assistance system configured to detect lane markings in a perspective image of a road in front of a vehicle, the perspective image comprising a vanishing point, wherein a position of the vanishing point depends upon a road curvature, the driver assistance system comprising a processor configured to:
- extract a plurality of features from the perspective image for generating a set of feature coordinates, wherein the set of feature coordinates defines respective positions of the plurality of features in the perspective image;
- generate a plurality of pairs of feature coordinates, wherein each of the pairs of feature coordinates defines a straight line; and
- estimate a lane curvature on the basis of a subset of the plurality of pairs of feature coordinates, wherein for each pair of feature coordinates of the subset of the plurality of pairs of feature coordinates, the straight line defined by the respective pair of feature coordinates intersects a predefined target portion of the perspective image, wherein the predefined target portion defines an area of the perspective image where a plurality of possible positions of the vanishing point can appear,
- wherein one or more pairs of feature coordinates of the plurality of pairs of feature coordinates are excluded from the subset of the plurality of features, wherein for each pair of feature coordinates of the one or more pairs of feature coordinates, a straight line defined by the pair of feature coordinates does not intersect the predefined target portion.

2. The system of claim 1, wherein the predefined target portion has a quadrilateral shape in the perspective image.

3. The system of claim 1, wherein the processor is configured to estimate the lane curvature on the basis of the subset of the plurality of pairs of feature coordinates using a RANSAC algorithm.

4. The system of claim 3, wherein the processor is configured to estimate the lane curvature on the basis of the subset of the plurality of pairs of feature coordinates using the RANSAC algorithm by performing the following steps:
- randomly selecting n pairs of feature coordinates from the plurality of pairs of feature coordinates, wherein n is a minimum number required to generate a fitting model;
- generate the fitting model on the basis of then pairs of feature coordinates;
- counting the number of pairs of feature coordinates consistent with the fitting model; and
- repeating the previous steps until a fitting model consistent with a large number of pairs of feature coordinates is found.

5. The system of claim 1, wherein the processor is configured to generate the plurality of pairs of feature coordinates: by dividing the perspective image into a plurality of horizontally extending stripes, and by processing the plurality of horizontally extending stripes from bottom to top.

6. The system of claim 5, wherein for a currently processed horizontally extending stripe, of the horizontally extending stripes, the processor is configured: to divide the currently processed horizontally extending stripe into a plurality of source windows, and to generate first feature coordinates, of a pair of feature coordinates of the plurality of pairs of feature coordinates, by selecting feature coordinates from at least one feature located in at least one of the plurality of source windows.

7. The system of claim 6, wherein for the currently processed horizontally extending stripe, the processor is configured: to divide a neighbouring horizontally extending stripe above the currently processed horizontally stripe into a plurality of destination windows, and to generate second feature coordinates of the pair of feature coordinates by selecting feature coordinates from at least one feature located in at least one of the plurality of destination windows.

8. The system of claim 7, wherein the plurality of destination windows of the neighbouring horizontally extending stripe above the currently processed horizontally extending stripe are at least partially overlapping.

9. The system of claim 1, wherein the processor is configured: to cluster the plurality of straight lines defined by the plurality of pairs of feature coordinates of the subset of the plurality of pairs of feature coordinates into a set of straight line clusters comprising one or more of the plurality of straight lines, and to determine for each straight line cluster a representative cluster line.

10. The system of claim 9, wherein the processor is configured to estimate the lane curvature on the basis of the set of representative cluster lines.

11. The system of claim 1, wherein the system further comprises a stereo camera configured to provide the perspective image of the road in front of the vehicle as a stereo image having a first channel and a second channel.

12. The system of claim 11, wherein the processor is configured: to independently extract features from the first channel of the stereo image and the second channel of the stereo image, and to determine those features, which have been extracted from both the first channel and the second channel of the stereo image.

13. A method of detecting lane markings in a perspective image of a road in front of a vehicle, the perspective image defining a vanishing point, wherein a position of the vanishing point depends upon a road curvature, and wherein the method comprises:
- extracting a plurality of features from the perspective image for generating a set of feature coordinates, wherein the set of feature coordinates defines respective positions of the plurality of features in the perspective image;
- generating a plurality of pairs of feature coordinates, wherein each of the pairs of feature coordinates defines a straight line; and
- estimating a lane curvature on the basis of a subset of the plurality of pairs of feature coordinates, wherein for each pair of feature coordinates of the subset of the plurality of pairs of feature coordinates, the straight line defined by the respective pair of feature coordinates intersects a predefined target portion of the perspective image, wherein the predefined target portion defines an area of the perspective image where a plurality of possible positions of the vanishing point can appear;
- wherein one or more pairs of feature coordinates of the plurality of pairs of feature coordinates are excluded from the subset of the plurality of features, wherein for each pair of feature coordinates of the one or more pairs of feature coordinates, a straight line defined by the pair of feature coordinates does not intersect the predefined target portion.

14. A non-transitory computer readable medium comprising program code for performing the method of claim 13 when executed on a computer or a processor.

15. The system of claim 1, wherein the plurality of features are lane markings and the set of feature coordinates are lane marking coordinates.

* * * * *

UNITED STATES PATENT AND TRADEMARK OFFICE
CERTIFICATE OF CORRECTION

PATENT NO. : 11,164,012 B2
APPLICATION NO. : 16/729268
DATED : November 2, 2021
INVENTOR(S) : Boev et al.

It is certified that error appears in the above-identified patent and that said Letters Patent is hereby corrected as shown below:

In the Claims

Claim 4: Column 11, Line 40: "generate the fitting model on the basis of then pairs of" should read -- generate the fitting model on the basis of the n pairs of --.

Signed and Sealed this
Twenty-eighth Day of June, 2022

Katherine Kelly Vidal
*Director of the United States Patent and Trademark Office*